May 3, 1955
L. P. MACARDIER
2,707,722
ELECTRIC CONDUIT WITH GAS UNDER PRESSURE
IN THE INSULATING MATERIAL
Filed Feb. 24, 1948
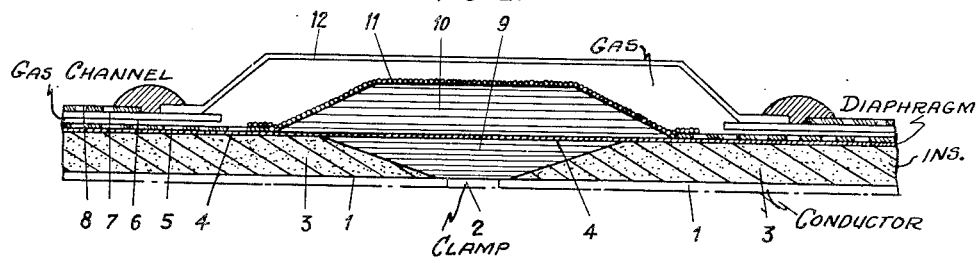
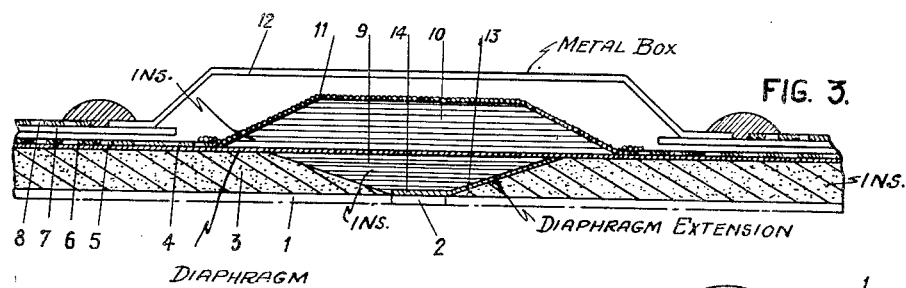
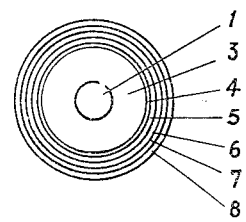
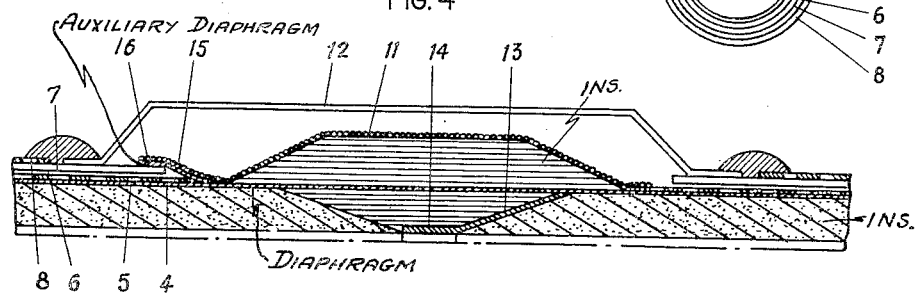
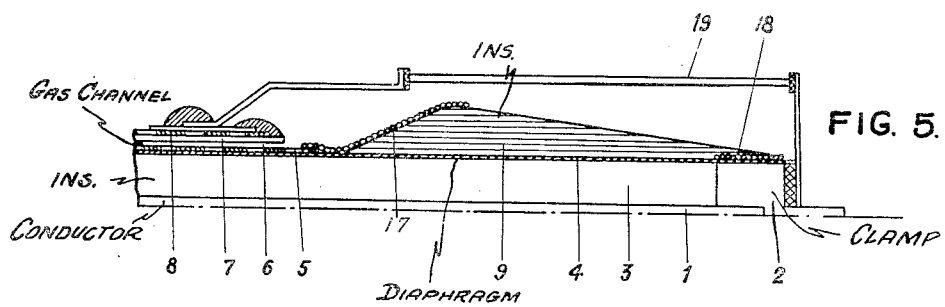
INVENTOR
LOUIS PIERRE MACARDIER
BY Adams + Bush
ATTORNEYS United States Patent Office 2,707,722
Patented May 3, 1955

2,707,722

ELECTRIC CONDUIT WITH GAS UNDER PRESSURE IN THE INSULATING MATERIAL

Louis Pierre Macardier, Lyon, France, assignor to Compagnie Generale d'Electricite, Paris, France Application February 24, 1948, Serial No. 10,488
In France January 21, 1947

Section 1, Public Law 690, August 8, 1946
Patent expires January 21, 1967

10 Claims. (Cl. 174—22)

High voltage cables are known which are termed "with gaseous cushion" the insulating material of which is kept under pressure by means of a gas which penetrates into the insulating material. The conduits serving for the passage of the gas under pressure are placed between the cable core and its tight protection sheath which is suitably hooped or bound to resist the gas pressure.

In conduits comprising cables of this type it is possible that the impregnation material may form accumulations or plugs in the lower parts of the conduit between the lead sheath and the insulating material, which would block up the passage of the pressure gas. To avoid this danger according to this present invention, there is provided for the cables and accessories of the conduits, the application to the external surface of the insulating material of the cable, of a flexible diaphragm permeable to gases and impervious to the impregnation material and provided with surrounding hoops or binding elements as bands to resist high pressures. The flexible diaphragm composed ordinarily of one or more layers of silk bands varnished or consisting of synthetic material covered with one or more sets of metallized papers or metal foils, is generally hooped or bound in the cables by bands of non-metal bands, or brass, copper magnetic steel or aluminum alloy with silicon and manganese such as "Almasilium" and the like. The purpose of this hooping or binding is to prevent the diaphragm from being distended under the effect of the internal pressure due to the expansion of the impregnation material when hot and moreover due to the departure from the level of the impregnation material when hot and moreover to the departure from the level in the lower parts of the conduit causing accumulations of impregnating material at particular spots.

This present invention provides for the application of the accessories serving for the connection of the lengths of the cables, methods for special production to make junction boxes allowing of the passage of the gases without the risk of obstruction by blocking: also stop junction boxes allowing of the passage of the gases and preventing the passage of the impregnation material from one side of the box to the other; also in a modified form for stop junction boxes preventing at the same time the passage of the gas and the passage of the impregnation material from one side to the other of the box; also in a modified form for terminal boxes with passage of the gas about the reinforced insulation of these boxes without outflow of the impregnation material.

The present invention is explained in detail in the figures of the accompanying drawing which shows several embodiments of a cable and its accessories according to this invention.

In the drawing Fig. 1 is a transverse section of such a cable. Fig. 2 is a longitundinal section of a single junction box for connecting together two cable lengths. Fig. 3 is a longitudinal section of a stop junction box allowing of the passage of the gases while preventing the passage of the impregnating material from one length of cable to the other. Fig. 4 is a longitudinal section of a double junction box preventing at the same time the passage of the gas and the passage of the impregnating material, from one length of cable to the other. Fig. 5 is a longitudinal section of a terminal box.

In Fig. 1 the cable shown is a single-conductor cable 1 the usual cable insulating material 3 of which is covered by a flexible diaphragm 4 permeable to the gases and non-pervious to the impregnating material up to a certain pressure for a given temperature: this diaphragm is hooped or bound by metal bands, non-magnetic, 5. Between the hooping or binding 5 and the lead sheath 7 there is a slight play forming an annular space serving as channel 6 for the gas under pressure. The lead sheath itself is covered with hooping or binding 8 designed to resist the gas pressure and covered by suitable external protection.

About the connection wire-clamping device 2 the insulation of the cables is reconstituted as usual at 9 and the diaphragm 4 is extended over this reconstituted insulating substance. An additional layer of insulating material shaped by hand or by machine is applied at 10 and surrounds and binds and retains the diaphragm 4. The binding 5 is prolonged manually, as shown at 11, over this insulating reinforcement.

For a cable with several conductors, the construction would be the same: each insulated conductor would be covered by a hooped or bound flexible diaphragm and the gas could circulate in the channels provided in the packing situated between the conductors after assembly.

As stated the flexible diaphragm 4, pervious to the gas and non-pervious to the impregnation material up to a certain pressure, may be constituted by varnished silk bands or synthetic material covered by one or more bands of paper, metallized, or metal foil forming a sheath at lead potential, that is, at the potential of the outer lead sheath 7. If the diaphragm 4 is formed of varnished silk permeable to the gases and impermeable to the impregnating material it may be varnished with cooked linseed oil or a glycerophthalic resin. If the diaphragm consists of synthetic material covered with one or more layers of metallized paper or metal foils, such synthetic material may be polyvinyl chloride containing suitable plasticizing agents appropriate so that the diaphragm may be readily permeable to the gases; other suitable synthetic materials for the diaphragm are copolymer of vinyl chloride and vinyl acetate or polyvinyl butyral mixed with polyvinyl alcohol. These layers of metallized paper or metal foil are perforated to allow the passage of the gases, or perforated ribbons of aluminum or copper may be used.

When the internal pressure increases consequent upon the expansion of heated impregnation material and the departure from the level the diaphragm 4 is applied against the hoop or binding 5 and remains impervious to the impregnation material which thus cannot flow in to the channel 6. By way of example it has been found by experiment that a diaphragm formed of four varnished silk bands placed overlapping and covered by a thin band of aluminum of 3/100 mm., hooped or bound by four bands of thickness 10/100 of a mm. each of "Almasilium," such hooping or binding being able to resist indefinitely a pressure of 213.3 lbs./sq. in., provides for stoppage any flow of the impregnation material outside of the diaphragm up to a pressure of 56.9 lbs./sq. in. for a temperature of the insulating material of 60 deg. C. On the other hand the gas under a pressure of 213.3 lbs./sq. in. in the channel exterior to the diaphragm penetrates very rapidly into the insulating material and transmits the pressure of 213.3 lbs./sq. in. to the vicinity of the conductor in almost instantaneous manner.

In Fig. 2 the conductors of two cable lengths, connected, are shown by 1, the connection wire-clamp of the conductors being shown by 2. 3 represents the usual cable insulating material of the two sections of the cable, 4 is the diaphragm covering this insulating material, 5 is the hooping or binding of the diaphragm, 6 the passage channel for the gas, 7 the lead sheath of each of the cables, 8 the hooping or binding and the external protection for these lead sheaths. As shown, the usual cable insulating material 3 of each cable is cut away to expose its conductor 1, and is also cut back obliquely from the exposed end of its conductor 1 to form a terminal cone whose apex is on the exposed portion of the conductor 1, forming a conical terminal face. About the connection wire-clamping device 2 the insulation of the cables is reconstituted as usual at 9 forming an interface with the cut back usual cable insulating material 3, and the diaphragm 4 is extended over this reconstituted insulating substance. An additional layer of insulating material shaped out by hand or by machine is applied at 10 and surrounds the diaphragm 4. The binding 5 is prolonged manually as shown at 11 over this insulating reinforcement. The binding 11 may be wires or bands. The metal external box 12 is welded on both sides over the lead sheaths of the two cables and contains the connection thus constituted: between the extended binding 11 and the box 12 there is a space in which the gas under pressure coming from the channel 6 may pass freely.

In Fig. 3 the same numerals represent the same parts of the different connection pieces but in addition the diaphragm 4 is extended manually at 13 over the external surface of one of the cones cut in the usual insulating material 3 of one of the cables, and at 14 over the connection wire-clamping device 2. That is, as shown, the diaphragm portion 13 extends along the interface between the cut end of the cable insulation 3 of one cable adjacent the bared end of its conductor and the joining insulation 9, and the diaphragm portion 13 also extends at 14 between clamp 2 and joining insulation 9. The presence of the diaphragm at 13 and 14 prevents the impregnation material of the section to the left side of the figure from passing into the right-hand section. For stopping the passage of the impregnating material in the reverse direction the diaphragm 13 would have been placed on the left side, so that the pressure always has the tendency to apply the diaphragm over the cone formed by the usual insulating material of the cable. Moreover these parts at 13 and 14 of the diaphragm bear against the insulating material 9 reconstituted. Also there are obtained stop junctions for the impregnating material which can be placed in the sloping parts of the conduits every time when the internal pressure due to the departure from the level attains 3 to 4 kgs./cm.$^2$ or 42.5 to 57 lbs./in.$^2$ The gas under pressure passes freely from one side to the other of the conduits between the binding 11 and the box 12.

In Fig. 14 the same numerals represent the same parts of the different connection pieces of Fig. 3 but also an auxiliary diaphragm 15 similar to the diaphragm 4 is hand-wound on one side of the junction on the terminal part of the cable lead sheath 7 and on the terminal part of the hooping 5 on the same side. This diaphragm 15 is reinforced from the point of view of tightness to gases by a coating of varnish between each layer. The winding of this auxiliary diaphragm 15 is extended over several centimeters in length on one side of the auxiliary diaphragm 4 which covers the section of the cable on the same side, elsewhere upon the lead cable. A binding 16 covers this diaphragm 15 and is continued by the binding 11 which covers the reinforced insulation in the center part. It will be evident that in the construction of Fig. 4 the diaphragm 15 stops the passage of the gas from one side to the other side of the conduit. Thus there is obtained through the diaphragm 13, 14 and 15 a double stop joint both for the gas and for the impregnation material. This process allows of dividing the conduits into sections of a certain length to facilitate searching for gas leaks.

Fig. 5 shows a terminal box for the conduit for the pressure gas in which this invention provides means for preventing the impregnation material of the cable from blocking up the passage of the gas under pressure. In this figure the cable conductor is shown by 1 and the wire-clamping device forming end terminal is shown by 2. The insulating material 3 of the cable is covered over the whole internal length of the terminal box by the flexible diaphragm 4. The binding 5 of the diaphragm on the cable is prolonged at 17 over the cone of the reinforcing insulating substance 9 of the cable end by an identical portion of binding suitably bound over the end of the binding 5. The channel for the passage of the gas is designated by 6, the lead sheath of the cable by 7 and the binding which surrounds this lead, by 8. Over the end wire-clamp 2 the flexible diaphragm 4 is covered by a portion of binding 18 of constitution identical to the binding 5. In the part comprised between the origin of the cone 17 and end wire-clamp 2, the diaphragm 4 is sufficiently hooped by the bands of impregnated paper which reinforce the insulating material of the cable from the electrical point of view, over the height of the end. The terminal casing containing the cable end is shown at 19 with the usual parts and the joints necessary for this type of terminal box under pressure.

Having now particularly described and ascertained the nature of my said invention and in what manner the same is to be performed, I declare that what I claim is:

1. In electric cable apparatus, two lengths of cable, an intermediate junction unit for connecting said two lengths of cable, each said length of cable comprising a conductor and impregnated cable insulation surrounding said conductor and a principal flexible diaphragm wound around said insulation and further comprising a principal retaining binding wound around said diaphragm and further comprising a lead sheath surrounding in spaced relation said insulation and said diaphragm and said binding, and forming therewith a pressure gas channel, said diaphragm being gas permeable and impervious to the impregnating material with which said insulation is impregnated, said junction unit receiving the ends of said two ends of cable and comprising a clamp for connecting together the two bared conductors of said two lengths and also comprising an enlarged casing surrounding said clamp and sealed to said sheaths of said lengths, joining insulation applied over said clamp to restore to normal radial depth the cable insulation cut away from the bared ends of said conductors, said diaphragm being continued through said junction unit between said lengths over said joining insulation, auxiliary insulation wound within said casing around said joining insulation and the portion of said diaphragm adjacent thereto, and joining retaining binding wound around said auxiliary insulation and wound in engaging continuous relation with terminal portions extending within said casing of the principal retaining binding of each said cable length.

2. Electric cable apparatus according to claim 1, and a lateral diaphragm constituted of the same material as said principal flexible diaphragm and extending from a point on said flexible diaphragm along the interface between the cut end of said cable insulation of a first said cable length adjacent its bared conductor, and said joining insulation, and further extending between said clamp and said joining insulation.

3. Electric cable apparatus according to claim 1 and a lateral diaphragm constituted of the same material as said principal flexible diaphragm and extending from a point on said flexible diaphragm along the interface between the cut end of said cable insulation of a first said cable length adjacent its bared conductor, and said joining insulation, and further extending between said clamp and said joining insulation, the sheath and the principal retaining binding of each said cable length extending to mutually spaced points into said casing, and an auxiliary diaphragm constituted of like materail as said principal flexible diaphragm and extending from a point on the lead sheath of the second said cable length to a point on the exposed portion of said principal diaphragm beyond the end of the principal retaining binding of said second cable length, said joining retaining binding being extended to be wound around the full extent of said auxiliary diaphragm to hold the same tightly against said principal diaphragm and said principal retaining binding and said lead sheath.

4. In electrical cable apparatus, a length of cable comprising a conductor and impregnated cable insulation surrounding said conductor and a flexible diaphragm wound around said insulation and further comprising a principal retaining binding wound around said diaphragm and further comprising a lead sheath surrounding in spaced relation said insulation and said diaphragm and said binding and forming therewith a pressure gas channel, said diaphragm being gas permeable and impervious to the impregnating material with which said insulation is impregnated, a terminal box at an end of said cable length comprising a casing spaced from said cable length and its insulation, a terminal clamp applied to the bared end of the conductor of said cable length within said casing, said cable insulation extending within said casing along said conductor up to said clamp, and said diaphragm extending within said casing the full length of said insulation and over said clamp, said principal retaining binding being terminated at a point a relatively short distance within said casing from its inlet end, auxiliary terminal insulation wound around said diaphragm over the portion of said cable length within said casing which has no principal retaining binding therearound, auxiliary retaining binding wound around the end within said casing of said principal retaining binding and around a portion of said auxiliary insulation adjacent thereto, and terminal retaining binding wound around the portion of said diaphragm which extends over said clamp, and said auxiliary insulation extending over said terminal retaining binding.

5. Electric cable apparatus according to claim 1, said principal flexible diaphragm being constituted of varnished silk bands.

6. Electric cable apparatus according to claim 1, said principal flexible diapraghm being constituted of varnished silk bands placed overlapping and covered by a thin aluminum band.

7. Electric cable apparatus according to claim 1, said lead sheath surrounding in spaced relation said insulation and said diaphragm and said binding, with slight play between said binding and said lead sheath forming a gas channel therebetween.

8. Electric cable apparatus according to claim 1, the impregnating material with which said insulation is impregnated, being all retained inside of said diaphragm.

9. In electric cable apparatus for installation on terrain having steep slopes, and comprising connecting boxes, an electric cable having a conductor and cable insulation impregnated with impregnating material and surrounding said conductor, a flexible diaphragm constituted of turns of bands wound overlappingly around said insulation, a retaining binding wound around said diaphragm, and a lead sheath surrounding in spaced relation said insulation and said diaphragm and said binding, and forming therewith a pressure gas longitudinal channel, said diaphragm as so held and retained by said binding being gas permeable and impervious to the impregnating material with which said insulation is impregnated.

10. In electric cable apparatus for installation on terrain having steep slopes, two lengths of cable, an intermediate junction unit for connecting said two lengths of cable, each said length of cable comprising a conductor and cable insulation impregnated with impregnating material and surrounding said conductor and a principal flexible diaphragm constituted of turns of bands wound overlappingly around said insulation and further comprising a principal retaining binding wound around said diaphragm and further comprising a lead sheath surrounding in spaced relation said insulation and said diaphragm and said binding, and forming therewith a pressure gas channel, said diaphragm as so held and retained by said binding being gas permeable and impervious to the impregnating material with which said insulation is impregnated, said junction unit receiving the ends of said two ends of cable and comprising a clamp for connecting together the two bared conductors of said two lengths and also comprising an enlarged casing surrounding said clamp and sealed to said sheaths of said lengths, joining insulation applied over said clamp to restore to normal radial depth the cable insulation cut away from the bared ends of said conductors, said diaphragm being continued through said junction unit between said lengths over said joining insulation, auxiliary insulation wound within said casing around said joining insulation and the portion of said diaphragm adjacent thereto, and joining retaining binding wound around said auxiliary insulation and wound in engaging continuous relation with terminal portions extending within said casing of the principal retaining binding of each said cable length.

References Cited in the file of this patent

UNITED STATES PATENTS

| | | |
|---|---|---|
| 1,524,124 | Fisher et al. | Jan. 27, 1925 |
| 1,941,614 | Meyer et al. | Jan. 2, 1934 |
| 2,112,739 | Eby | Mar. 29, 1938 |
| 2,213,875 | Webb | Sept. 3, 1940 |
| 2,236,286 | Dunsheath | Mar. 25, 1941 |
| 2,237,402 | Beaver et al. | Apr. 8, 1941 |
| 2,253,985 | Shanklin | Aug. 26, 1941 |
| 2,253,987 | Shanklin | Aug. 26, 1941 |
| 2,292,114 | Fritsche | Aug. 4, 1942 |
| 2,374,638 | Lee | Apr. 24, 1945 |
| 2,392,748 | Lee | Jan. 8, 1946 |